US012626534B2

(12) United States Patent
Langton et al.

(10) Patent No.: US 12,626,534 B2
(45) Date of Patent: May 12, 2026

(54) METHODS FOR FEATURELESS GAZE TRACKING IN ECOLOGICALLY VALID CONDITIONS

(71) Applicant: Linus Health, Inc., Boston, MA (US)

(72) Inventors: John Langton, Somerville, MA (US); Sean Tobyne, Boston, MA (US); Karl Thompson, Cambridge, MA (US)

(73) Assignee: Linus Health, Inc., Boston, MA (US)

( * ) Notice: Subject to any disclaimer, the term of this patent is extended or adjusted under 35 U.S.C. 154(b) by 356 days.

(21) Appl. No.: 18/517,382

(22) Filed: Nov. 22, 2023

(65) Prior Publication Data

US 2024/0169762 A1 May 23, 2024

Related U.S. Application Data

(60) Provisional application No. 63/427,300, filed on Nov. 22, 2022.

(51) Int. Cl.
*G06V 40/18* (2022.01)
*G06V 10/77* (2022.01)
(Continued)

(52) U.S. Cl.
CPC ........ *G06V 40/193* (2022.01); *G06V 10/7715* (2022.01); *G06V 10/82* (2022.01); *G06V 20/46* (2022.01)

(58) Field of Classification Search
CPC .. G06V 40/193; G06V 40/18; G06V 10/7715; G06V 10/82; G06V 20/46
See application file for complete search history.

(56) References Cited

U.S. PATENT DOCUMENTS

2017/0372487 A1* 12/2017 Lagun .................. G06N 3/0464
2019/0303722 A1 10/2019 Linden
(Continued)

FOREIGN PATENT DOCUMENTS

CN 112667078 A * 4/2021

OTHER PUBLICATIONS

International Search Report and Written Opinion for Application No. PCT/US23/80887 dated Mar. 1, 2024.

*Primary Examiner* — Carol W Chan
(74) *Attorney, Agent, or Firm* — Foley Hoag LLP; Erik A. Huestis; Lee Chedister

(57) ABSTRACT

Systems and methods are disclosed for gaze tracking. A method includes receiving a video of a user taken by a front-facing camera of a device having a screen, receiving dimensions of the screen, parsing the video into a series of uniform-dimension video frame images, inputting the series of uniform-dimension video frame images to a pretrained artificial neural network, thereby extracting a plurality of features from the series of uniform-dimension video frame images to determine a set of internal spatial hierarchy features on each of the uniform-dimension video frame images, inputting each set of hierarchy features to a fully connected layer, the fully connected layer producing an intermediate physical estimate of the user's gaze location on the screen relative to the device camera in centimeters, determining a series of screen locations based on the intermediate physical estimate and the dimensions of the screen, and labeling the gaze location on the screen.

20 Claims, 4 Drawing Sheets

(51) Int. Cl.
    *G06V 10/82*     (2022.01)
    *G06V 20/40*     (2022.01)

(56)            References Cited

U.S. PATENT DOCUMENTS

| 2020/0089315 | A1 | | 3/2020 | Stent | |
| 2021/0350184 | A1 | * | 11/2021 | Mallik | G06N 3/045 |
| 2021/0405742 | A1 | | 12/2021 | He | |
| 2022/0334637 | A1 | * | 10/2022 | Sharma | G06V 40/18 |
| 2024/0143077 | A1 | * | 5/2024 | Prasad | G06F 3/013 |

* cited by examiner

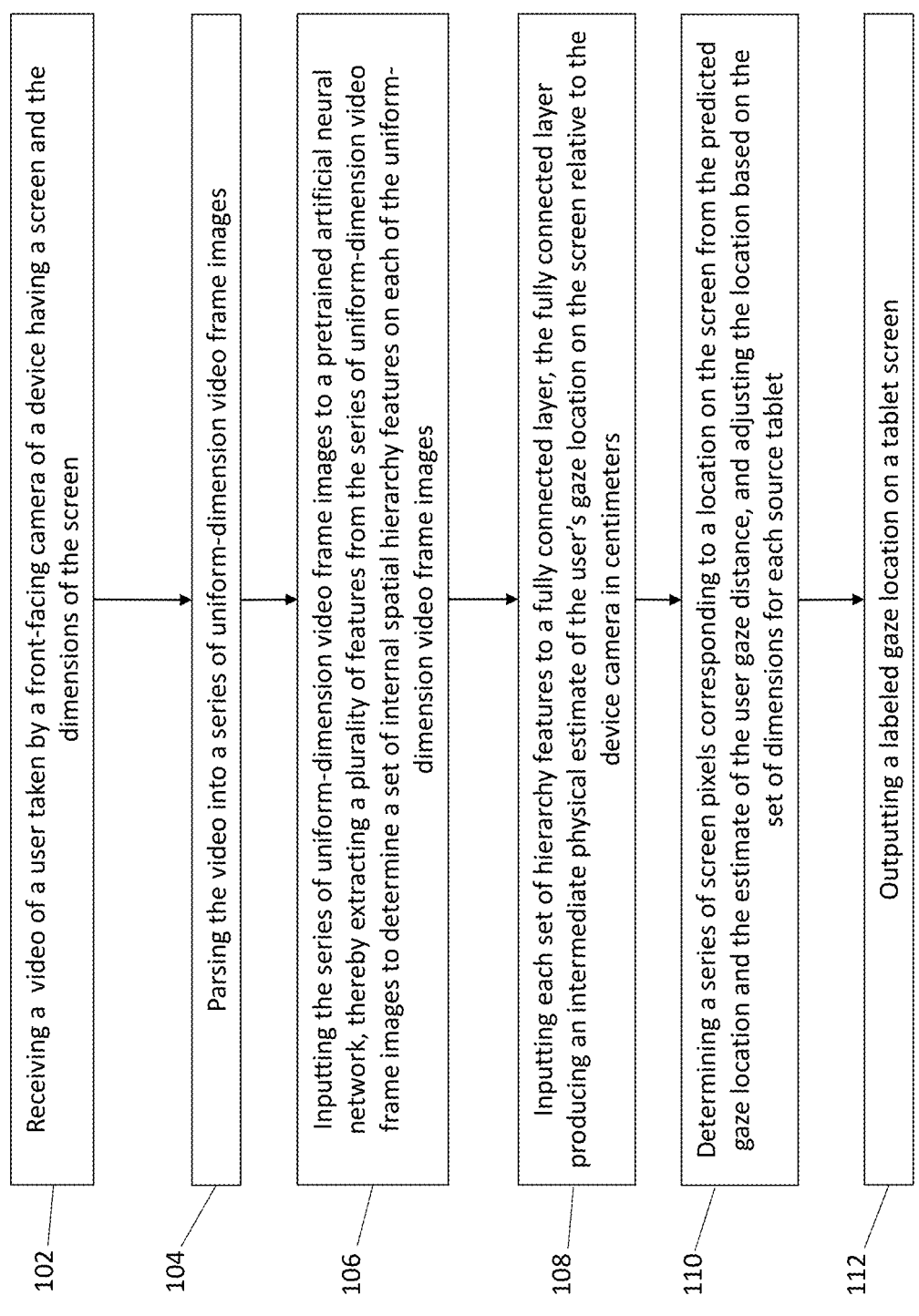

100

102 — Receiving a video of a user taken by a front-facing camera of a device having a screen and the dimensions of the screen 104 — Parsing the video into a series of uniform-dimension video frame images 106 — Inputting the series of uniform-dimension video frame images to a pretrained artificial neural network, thereby extracting a plurality of features from the series of uniform-dimension video frame images to determine a set of internal spatial hierarchy features on each of the uniform-dimension video frame images 108 — Inputting each set of hierarchy features to a fully connected layer, the fully connected layer producing an intermediate physical estimate of the user's gaze location on the screen relative to the device camera in centimeters 110 — Determining a series of screen pixels corresponding to a location on the screen from the predicted gaze location and the estimate of the user gaze distance, and adjusting the location based on the set of dimensions for each source tablet 112 — Outputting a labeled gaze location on a tablet screen

FIG. 1

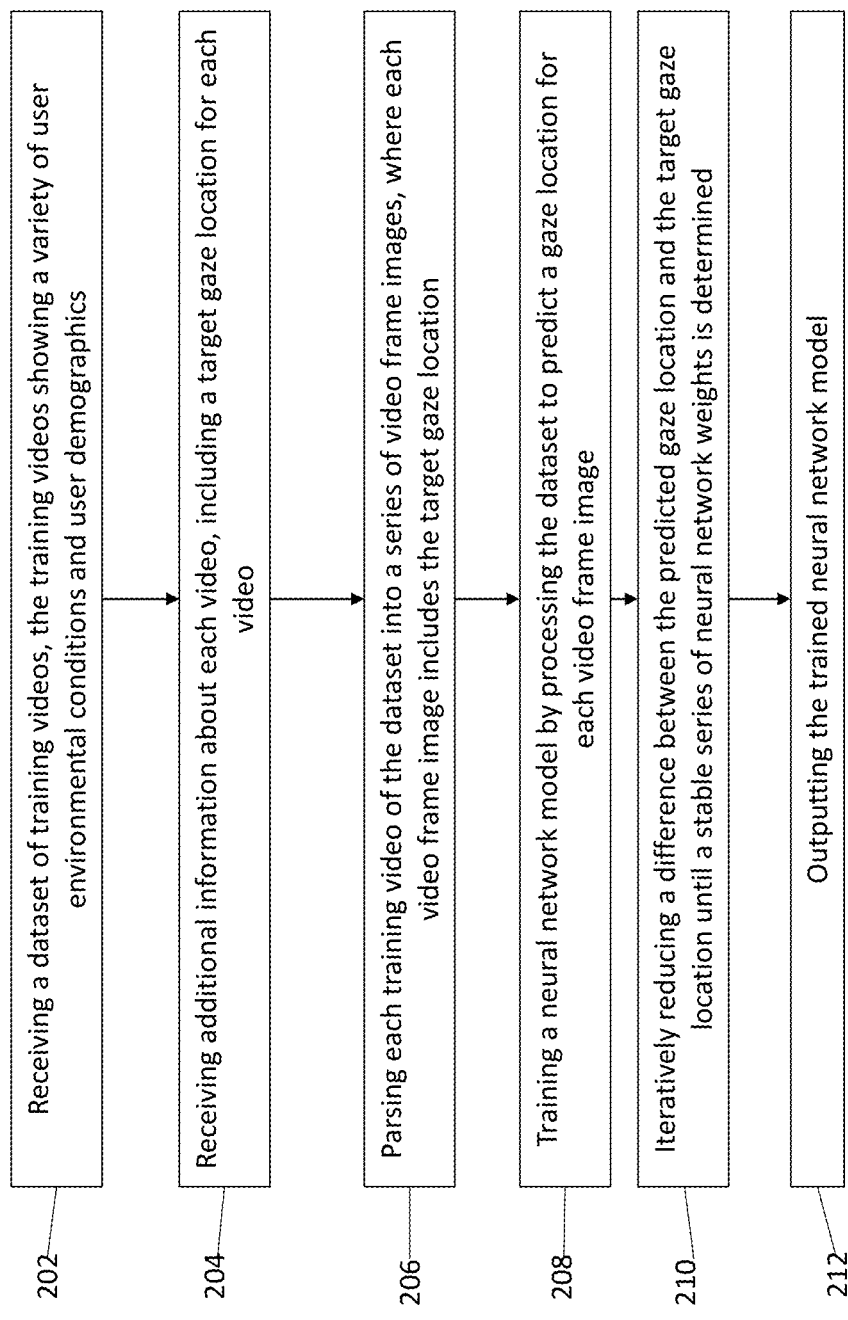

200

202   Receiving a dataset of training videos, the training videos showing a variety of user environmental conditions and user demographics 204   Receiving additional information about each video, including a target gaze location for each video 206   Parsing each training video of the dataset into a series of video frame images, where each video frame image includes the target gaze location 208   Training a neural network model by processing the dataset to predict a gaze location for each video frame image 210   Iteratively reducing a difference between the predicted gaze location and the target gaze location until a stable series of neural network weights is determined 212   Outputting the trained neural network model

FIG. 2

METHODS FOR FEATURELESS GAZE TRACKING IN ECOLOGICALLY VALID CONDITIONS

RELATED APPLICATION(S)

This application claims the benefit of priority to U.S. Provisional Application No. 63/427,300, filed on Nov. 22, 2022, which is hereby incorporated by reference in its entirety.

TECHNICAL FIELD

The present disclosure relates generally to tracking a subject's gaze and, in particular, to systems and methods for gaze tracking of tablet users through analysis of video captured from a tablet's front facing video camera via a computer vision-based deep learning model.

BACKGROUND

Gaze tracking may be achieved through facial feature extraction from a front-facing camera. In an exemplary approach, machine learning algorithms are used to extract facial features from video frames and then estimate the user's gaze target using deep learning models that analyze the extracted facial features. One main drawback to this approach is that facial feature extraction methods are often prone to failure in the presence of complex artifacts in the captured video. Complex artifacts include face masks or coverings. Other issues arising during facial feature extraction include video low lighting conditions, varying distance between the subject and the camera, background movement, and other common video failures. Such failures can lead to partial or complete loss of gaze tracking capability.

Accordingly, a method of gaze tracking that does not rely on facial feature extraction is needed. Instead of relying on facial features, disclosed embodiments provide a method that passes raw video footage to a complex deep convolutional neural network that is able to intrinsically extract important features from video frames even in the presence of the aforementioned artifacts and issues, and propagate these important features throughout the network, culminating in an output representing a gaze target location for each video frame. Furthermore, for network training purposes, a custom ecologically valid dataset including videos of users wearing face masks and/or standing in varying lighting conditions and distances from a camera can be employed to enhance predictive capabilities in harsh conditions. This custom dataset results in the production of a gaze prediction for the entirety of the given captured video, which is crucial in applications requiring continuous, uninterrupted gaze tracking.

The foregoing general description and the following detailed description are exemplary and explanatory only and are not restrictive of the disclosure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for tracking gaze location of a user on a screen.

In one embodiment, a method includes: receiving a video of a user taken by a front-facing camera of a device having a screen; receiving dimensions of the screen; parsing the video into a series of uniform-dimension video frame images; inputting the series of uniform-dimension video frame images to a pretrained artificial neural network, thereby extracting a plurality of features from the series of uniform-dimension video frame images to determine a set of internal spatial hierarchy features on each of the uniform-dimension video frame images; inputting each set of hierarchy features to a fully connected layer, the fully connected layer producing an intermediate physical estimate of the user's gaze location on the screen relative to the device camera; determining a series of screen locations based on the intermediate physical estimate and the dimensions of the screen; and labeling the gaze location on the screen.

In another embodiment, a device includes: a front-facing camera, a screen, at least one memory storing instructions, and at least one processor configured to execute the instructions to perform operations including: receiving a video of a user taken by a front-facing camera of a device having a screen, receiving dimensions of the screen, parsing the video into a series of uniform-dimension video frame images, inputting the series of uniform-dimension video frame images to a pretrained artificial neural network, thereby extracting a plurality of features from the series of uniform-dimension video frame images to determine a set of internal spatial hierarchy features on each of the uniform-dimension video frame images, inputting each set of hierarchy features to a fully connected layer, the fully connected layer producing an intermediate physical estimate of the user's gaze location on the screen relative to the device camera, determining a series of screen locations based on the intermediate physical estimate and the dimensions of the screen, and labeling the gaze location on the screen.

In an alternate embodiment, a non-transitory computer-readable medium storing instructions that, when executed by processor, cause the processor to perform a method that includes: receiving a video of a user taken by a front-facing camera of a device having a screen, receiving dimensions of the screen, parsing the video into a series of uniform-dimension video frame images, inputting the series of uniform-dimension video frame images to a pretrained artificial neural network, thereby extracting a plurality of features from the series of uniform-dimension video frame images to determine a set of internal spatial hierarchy features on each of the uniform-dimension video frame images, inputting each set of hierarchy features to a fully connected layer, the fully connected layer producing an intermediate physical estimate of the user's gaze location on the screen relative to the device camera, determining a series of screen locations based on the intermediate physical estimate and the dimensions of the screen, and labeling the gaze location on the screen.

BRIEF DESCRIPTION OF THE DRAWINGS

The accompanying drawings, which are incorporated into and constitute a part of this specification, illustrate various exemplary embodiments and together with the description, serve to explain the principles of the disclosed embodiments.

FIG. 1 is a flowchart illustrating an exemplary method for tracking gaze location, according to techniques disclosed herein.

FIG. 2 is a flowchart illustrating an exemplary method for training a neural network to predict gaze location, according to techniques disclosed herein.

DETAILED DESCRIPTION

Figure 3:
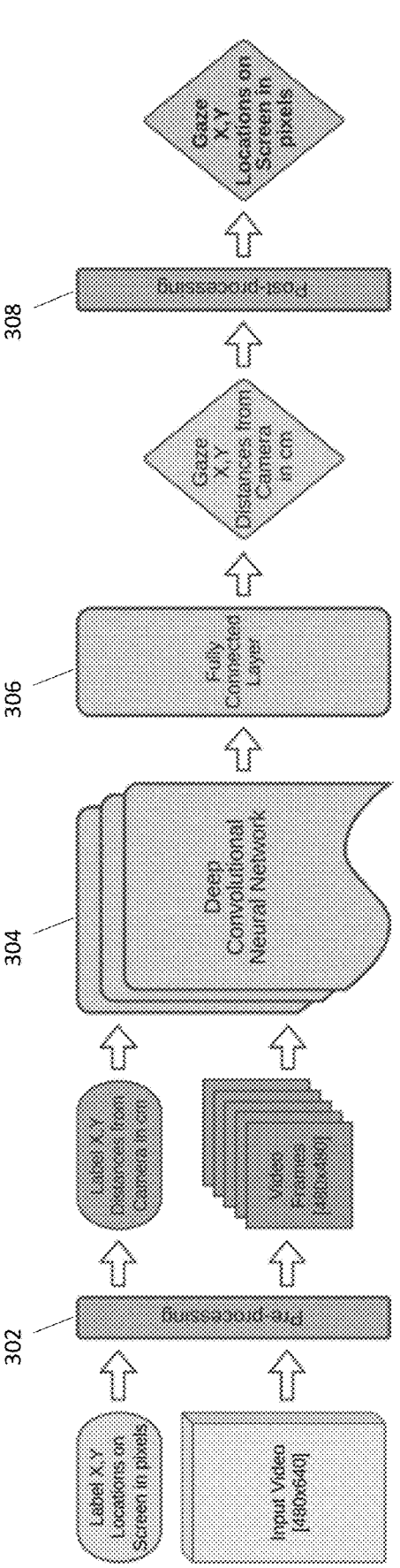
FIG. 3 is a workflow illustrating an exemplary process of gaze tracking, according to techniques disclosed herein.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Generally, alternative methods of gaze tracking through tablet front facing cameras rely on facial feature extraction and landmark tracking as key components of tracking architectures. This practice may be used to reduce computational requirements and maximize model performance since it isolates the tablet user's face and eyes into individual images the model can analyze and understand with minimal external conditions, such as background noise and irrelevant image components. The main drawback to this methodology is the loss of video frames the feature extractor models fail to process, an unacceptable tradeoff for many industry uses. Additionally, facial feature extraction methods trained prior to the COVID pandemic fail to process images of mask-wearing individuals because a large portion of the face is occluded, which makes these methods unsuitable for use in a variety of environments where mask use is more common. Embodiments disclosed below forgo the features extraction step at the cost of increased computational needs and data complexity, in order to preserve the entire content of the original video recording and to increase ecological validity and compatibility with various environmental conditions, crucial for many industry applications including cognitive screening.

One significant difference between alternative methods and the methods described here is the degree of preprocessing required before passing input images to a model for training or inference purposes. Alternative methods rely on a preprocessing stage that applies a facial feature detection algorithm that creates cropped images containing the user's eyes and/or face. The cropped images are then used as the input features to a predictive model of gaze location. In embodiments of the present disclosure, preprocessing includes only a resizing of the images; as such, the method is "featureless" in that it does not require preprocessing steps to generate features from the data, and instead takes advantage of a convolutional neural network's (CNN) intrinsic ability to algorithmically learn the spatial hierarchy of input image data, without human supervision, through model training. These internally-derived features are often higher dimensional and much more complex compared to previous methods (i.e., manually-cropped facial features), and may place a higher importance on parts of the image that previous methods may not value, such as face location within the input images, when inferring the user's gaze targets.

The nature of the featureless input data used and the method by which the data is extracted are spatial relationships between the different components of the raw images. These spatial relationships are represented by numerical arrays and learned internal to the CNN. Through model training, the CNN learns which features are important for each individual image based on the target output variable (i.e., ground truth user gaze location). Model flexibility and compatibility are increased because the internal features most relevant to a specific prediction on a specific image may be different from the internal features used to make predictions on another image featuring a different user, body pose, environmental illumination conditions, distance from the camera, and/or mask/glasses usage. These features are different from the model-based facial features used in previous methods, as they are not fixed croppings of the raw image but instead a hierarchical numerical representation of the different image components' relevance to the gaze target prediction.

Accordingly, the methods as described below include a neural network architecture able to process video frames directly without facial feature extraction. This enables analysis of complex video recordings containing difficult artifacts such as face masks, low environmental lighting, high distance from camera, and background movement that traditional facial feature extraction methods struggle with. This is accomplished by training the neural network on a custom training video dataset. This dataset is designed to maximize the model's predictive capabilities, through the collection of a diverse set of data points encompassing varied participant demographics, environmental conditions, eye glasses and face mask usage, and user distance from camera.

FIG. 1 is a flowchart illustrating an exemplary method 100 for gaze tracking using a machine learning model, according to an exemplary embodiment of the present disclosure. For example, exemplary method 100 (e.g., steps 102-112) may be performed by a processor automatically or in response to a request by a user.

The exemplary method 100 for gaze tracking may include one or more of the following steps. In step 102, the method may include receiving a video. The video is taken by a front-facing camera on a device, such as a tablet, where the user is gazing at the device, and where a user is a distance from the front-facing camera on the device. The distance between the user and the camera may vary between videos in the plurality of videos. The dimensions of each source tablet or device for the plurality of videos is also received, where the dimensions include information regarding the size, height, and width of a screen of the source tablet, where the user's gaze in each video is directed towards the screen, and in particular to an object on the screen.

While method 100 is described using a tablet device, is it contemplated that the videos may be taken by a front facing camera on any suitable device, including a mobile phone, laptop computer, or wearable device. The user's gaze is directed towards some point on the device screen. The device can be one of any available computing device, and the distance between the camera and user can widely vary based on the user. It is contemplated that the plurality of videos can feature a wide ranging subject matter, covering different user demographics and circumstances. Lighting and other environmental conditions can also vary greatly within the plurality of videos received. It is also considered that users may be wearing masks, glasses, or other facial coverings. The plurality of videos can cover a wide range of distances to the user, dimensions of the user, and environmental conditions within each video of the plurality of videos.

In step 104, the method may include preparing each video of the plurality of videos for processing by a neural network. Each received video is parsed into a series of video frame images, where each image undergoes a rescaling transformation to reach a uniform format with a standard height and width that the network has been trained to accept. The uniform format ensures that each image has the same dimensions and file format; for example, each image may be a JPEG file with a size of 480×480 pixels. Images are sorted temporally based on the order they appear in the video as received. Preparing the files for processing does not require adjusting the images for different environmental conditions or circumstances including distance, etc., instead allowing for a wide variety of conditions to be present in the videos. The images are not cropped or resized such that the image is distorted, but the images are transformed into the standard dimensions to create the uniformity between images.

Additionally, each image is assigned a label corresponding to the approximate location of the user's gaze during each video frame, relative to the tablet's camera location. Label coordinates are correlated to images using high precision timing information collected by the front facing video application, which allows accurate assignment of a gaze target location to each individual video frame without any additional calculations. The approximate location may be defined by two pixel measurements representing the horizontal and vertical displacements from the top left corner of the device screen. Screen locations are used to define ground truth gaze labels for each frame. Pairs of video frames and corresponding gaze locations constitute the input to the deep learning model for the purposes of training and evaluation.

In step 106, the method may include inputting the series of uniform video frames to a neural network, the neural network having been trained on a custom dataset. A plurality of features is extracted from the series of uniform video frame images to determine at least one pattern between features and to associate each extracted feature with a labeled approximate gaze location. During this "inference phase", the trained neural network is given the pre-processed video frames from unseen video files and is tasked with estimating a gaze location for each frame.

The neural network can be a convolutional neural network (CNN), another neural network variant, or any suitable machine learning model or trained algorithm. If the neural network is a CNN, the CNN's intrinsic capability to algorithmically learn the spatial hierarchy of input image data without human supervision is used to process the images. These internally-derived features from the series of images are often higher dimensional and much more complex than the features extracted by the traditional method of facial feature extraction. These features may place a higher importance on parts of the image that have not been valued by previous methods, such as face location within input images, when inferring the user's gaze target. Generally, these features are spatial relationships represented by numerical arrays between the different components of the raw images. Through model training, the neural network model learns what features (or image components) may be important for each individual image based on a target output variable. These features are different from the model-based facial features used in previous methods, as they are not fixed croppings of the raw image but instead a hierarchical numerical representation, or condensed data representation, of the different image components' relevance to the gaze target prediction.

During model inference (step 106), the trained neural network is shown the previously unseen video frame images and tasked with producing a gaze location estimation or prediction for each image based on neural network weights learned during training. The trained neural network determines one or more patterns from the data representation of the input image features to produce the gaze location. Patterns are established in a series of images from the same video, and can include details on user proportions and distances from the tablet. As the model is fed entire raw video frame images containing the user's heads and parts of the user's body and surroundings, these elements are automatically taken into consideration when analyzing the spatial dependencies between image components. For example, the model learns during training that the head and body proportions between two users that are looking at the same part of the screen but from different distances from the camera may be different, but for the purpose of predicting gaze, the two are equivalent. Accordingly, in this situation the model produces a similar estimation of gaze location.

In step 108, the method may include passing the labeled image from the neural network to a fully connected layer. The fully connected layer produces an intermediate estimate, based on the trained neural network's learnings, of the user's gaze location. This intermediate estimate includes a set of coordinates representing a distance between the user's gaze target on the screen and the device camera. The distance is represented as two numbers representing the horizontal and vertical components of the gaze location on the screen relative to the camera in centimeters.

In step 110, the method may include determining a series of screen pixels corresponding to a location on the screen from the physical predicted gaze location in centimeters, and adjusting the location of the pixels based on the set of dimensions for each source tablet. Specifically, the produced series of gaze predictions from the trained neural network is passed through a post-processing pipeline, which conducts calculations based on each device's unique dimensions to transform the produced physical gaze estimations into a series of screen pixel locations corresponding to the objects on the screen that the user observed in every video frame.

In step 112, the method may include outputting a labeled set of coordinates indicating gaze location on a screen of the tablet. The output screen may be used to predict a user's gaze location throughout a brain health assessment (e.g., a cognitive assessment or behavioral assessment), assisting administrators in diagnosing brain health disabilities such as cognitive impairment, depression and anxiety, or neuromotor disorders. It is contemplated that with this method of gaze tracking, gaze location and predefined regions of interest may be correlated to predict a user's brain health status. As more data is collected, gaze tracking may be added on to existing and new assessments to analyze user's gaze paths and potentially extract meaningful insights about a user's cognitive, behavioral and/or neuromotor health through correlation with outside assessment scores and biomarkers.

FIG. 2 is a flowchart illustrating an exemplary method 200 of training a neural network, according to an exemplary embodiment of the present disclosure. For example, exemplary method 200 (e.g., steps 202-212) may be performed by a processor automatically or in response to a request by a user.

In step 202, the method may include receiving a dataset of training videos, the training videos including a variety of user environmental conditions and user demographics. Each video is taken using a front facing camera on a tablet device. This dataset of videos is designed to maximize the neural network model's predictive capabilities through the collection of a diverse set of data points encompassing varied participant demographics, environmental conditions, glasses and face mask usage, and user distances from the camera. By using a large training dataset comprising a wider range of conditions, error rates are reduced on complex input images featuring, for example, face masks, large distances from the camera, and/or dim lighting by introducing these conditions collectively in the training process. As a result of combining all images featuring different environmental conditions into one dataset, high user and environmental variability is created, which is crucial for supervised deep learning applications and for achieving high accuracy during real world deployment.

In one embodiment, the dataset contains video data showing faces of 962 human participants engaging with 21 different devices, captured by the devices' front facing cameras. Participants belong to a wide range of demographics, and a number of the participants are wearing glasses, face masks, or other articles on their face or head to increase the variability and range of the dataset. The devices also introduce a range of dimensions to take into account when determining a gaze location.

In step 204, the method may include receiving additional information about each video, including a target gaze location for each video in the dataset. The target gaze location may include labeled pixels on a screen showing where the user was looking. The additional information received may include device dimensions and timing information for when each video started and ended.

A gaze target may be obtained from an application running on the tablet, where a user is asked to look at a specific part of the tablet screen for a period of time, and then click on either the left or right side of the screen after the time period ends, based upon a brief reveal of the letters "L" or "R" on the screen. This task may be repeated a number of times, with each trial involving the user looking at randomly generated different parts of the screen. The user is recorded throughout the process, including detailed spatial and temporal information for the screen locations that the user is shown. This allows for relation of video footage captured for specific screen locations during analysis to the user.

Using information from the process of obtaining the gaze target, each video can be parsed into individual frames and each frame is associated with a certain gaze target location on the screen in step 206. The gaze target, along with device metadata, is used to train the neural network.

In step 208, the method may include generating a trained neural network model by processing the dataset to predict a gaze location for each video frame image. The neural network may be a CNN or any other suitable learning model.

During training, the neural network extracts each input image's features in the form of numerical spatial hierarchy dependencies, identifies patterns between extracted features from different images, and correlates the features to the input target gaze location for each video.

Effects arising from the different distances of users from the screen are implicitly accounted for by the model's training. Since the model is fed entire raw images containing not only user's heads but also parts of their bodies and surroundings, these elements are automatically taken into consideration by the trained neural network when analyzing the spatial dependencies between image components. Thus, the model does not require an explicit measurement of distance between the camera and the person, or require that the distance between camera and person be maintained. During training, the model learns that the head and body proportions between two users that are looking at the same part of the screen but at different distances from the camera may be different, but are equivalent for the purposes of predicting gaze.

In step 210, the method may include iteratively reducing a difference between the predicted gaze location and the target gaze location, until a stable series of neural network weights is determined. These stable weights are then used as parameters in the trained neural network, to output a stable and accurate predicted gaze location.

In step 212, the method may include outputting the trained neural network model. The trained neural network model may be configured to feed an output into a fully connected layer, such that additional calculations and adjustments to the output estimation may be performed.

FIG. 3 is a workflow illustrating an exemplary model 300 used for gaze tracking, according to techniques disclosed herein. For example, exemplary model 300 may be performed by a processor automatically or in response to a request by a user. The model may include a pre-processing pipeline 302, into which an input video with an XY coordinate label indicating a location on the video screen in pixels. The location indicates the target gaze of a subject user in the input video. In one embodiment, the input video may have a pixel dimension of 480×640. This dimension may be a result of the size of the source camera. The pre-processing pipeline 302 parses the input video into a series of video frame images, and transforms each image into a standard dimension for processing by a neural network 304. For example, the standard image pixel dimension for the series of video frame images may be 480×480. The pre-processing pipeline 302 also outputs a label XY distance between the gaze location on the screen and the device camera in centimeters.

The output series of uniform images is then input into a neural network 304, for example a deep CNN. The neural network 304 is given the pre-processed video frames from unseen video files and is tasked with estimating a gaze location for each frame, as described above in step 106 of exemplary method 100. The neural network 304 then outputs a predicted gaze location to a fully connected layer 306. The fully connected layer 306 produces an intermediate estimate of a user's gaze location on the screen relative to the device camera in centimeters. This intermediate estimate may be based upon the earlier input distance coordinates associated with the input videos.

At a final post-processing pipeline 308, the estimate from the fully connected layer 306 is adjusted to account for tablet or device dimension. Specifically, the screen dimension is used to accurately convert the predicted gaze locations from centimeters relative to the device camera to pixels on the screen of the tablet. The conversion is accomplished by shifting the gaze prediction reference point from the device camera to the device screen's top left corner, then using knowledge of the screen's specific pixel density to estimate the gaze prediction pixel location from its physical counterpart.

Figure 4:
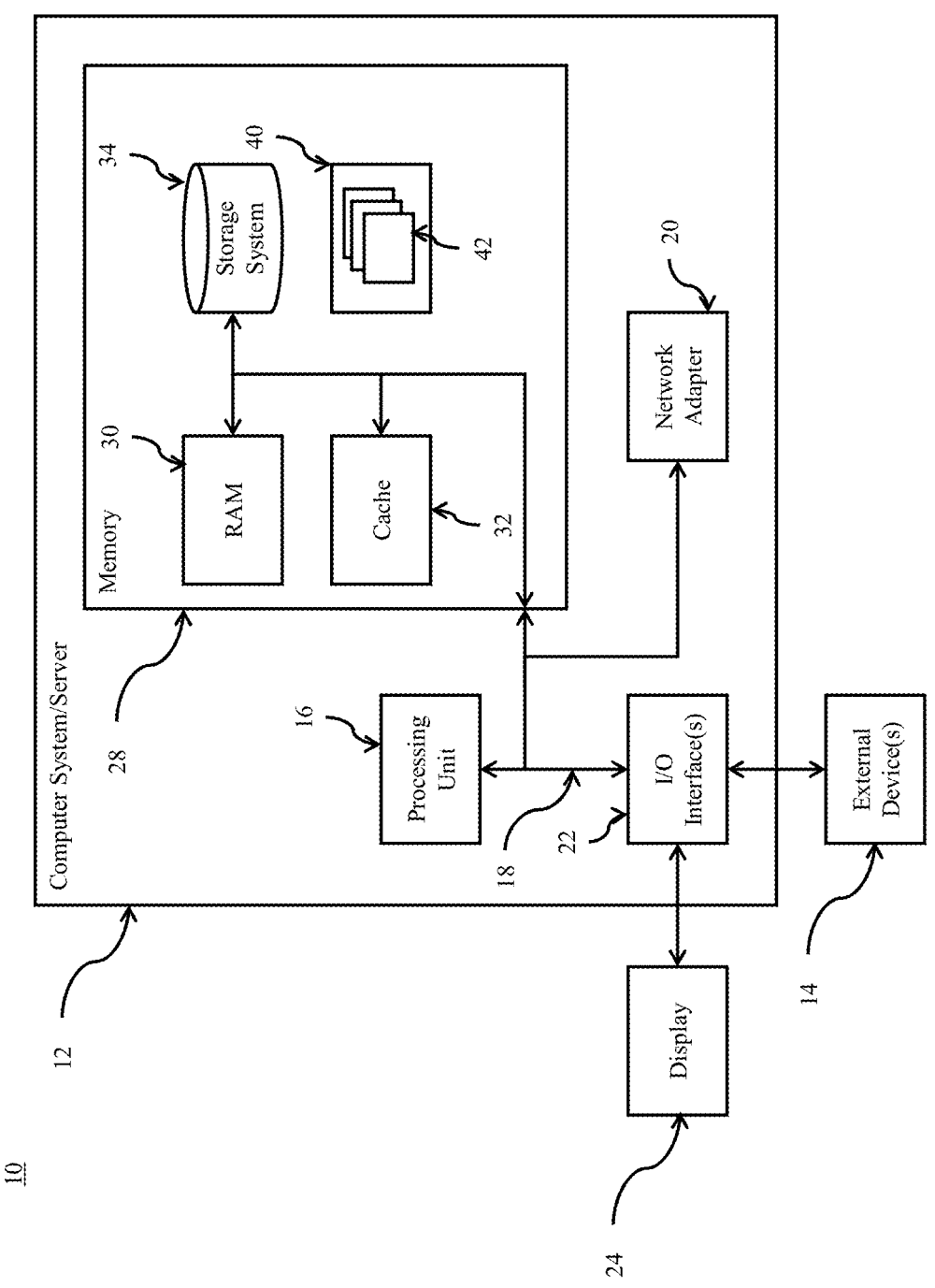
FIG. 4 is a computing node according to embodiments of the present disclosure.

FIG. 4 is a schematic of an exemplary computing node. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Algorithm Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, a learning system is provided. In some embodiments, a feature vector is provided to a learning system. Based on the input features, the learning system generates one or more outputs. In some embodiments, the output of the learning system is a feature vector. In some embodiments, the learning system comprises an SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

In some embodiments, the learning system is a trained classifier. In some embodiments, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method, comprising:

receiving a video of a user taken by a front-facing camera of a device having a screen;

receiving dimensions of the screen;

parsing the video into a series of uniform-dimension video frame images;

inputting the series of uniform-dimension video frame images to an artificial neural network that is pretrained, thereby extracting a plurality of features from the series of uniform-dimension video frame images to determine a set of internal spatial hierarchy features on each of the uniform-dimension video frame images;

inputting each set of internal spatial hierarchy features to a fully connected layer, the fully connected layer producing an intermediate physical estimate of the user's gaze location on the screen relative to the front-facing camera;

determining a series of screen locations based on the intermediate physical estimate and the dimensions of the screen; and labeling the gaze location on the screen.

2. The method of claim 1, wherein the artificial neural network is pretrained by:

receiving a dataset of training videos, the training videos showing a variety of user environmental conditions, facial coverings, and user demographics;

receiving a ground truth gaze location for each training video in the dataset;

parsing each training video into a series of video frame images, where each video frame image includes the ground truth gaze location;

training the artificial neural network by processing the dataset to predict a gaze location for each video frame image; and iteratively reducing a difference between the predicted gaze location and the ground truth gaze location until a stable series of neural network weights is determined.

3. The method of claim 2, wherein the variety of user environmental conditions comprises multiple environmental illumination settings.

4. The method of claim 2, wherein the training videos have a range of distances between the user and the camera.

5. The method of claim 1, wherein the uniform-dimension video frame images have a same pixel dimension and are of a same file type.

6. The method of claim 1, wherein an approximate location of the user's gaze is determined by the user tracking one or more objects across the screen.

7. The method of claim 1, further comprising:

determining at least one pattern between extracted features; and associating each extracted feature with a labeled predicted gaze location on each uniform-dimension video frame image.

8. The method of claim 7, wherein patterns are determined across the series of uniform-dimension video frame images.

9. The method of claim 1, wherein the extracted features comprise a spatial relationship of a component of the series of uniform-dimension video frame images, represented by a numerical array.

10. The method of claim 9, wherein the extracted features are ordered based on relevance to a gaze target prediction.

11. The method of claim 1, where image-specific features are of higher relevance.

12. The method of claim 1, wherein the artificial neural network is a convolutional neural network.

13. The method of claim 1, wherein the device is a tablet.

14. A device, comprising:

a front-facing camera;

a screen;

at least one memory storing instructions; and at least one processor configured to execute the instructions to perform operations comprising:

receiving a video of a user taken by the front-facing camera of the device having the screen;

receiving dimensions of the screen;

parsing the video into a series of uniform-dimension video frame images;

inputting the series of uniform-dimension video frame images to a pretrained artificial neural network, thereby extracting a plurality of features from the series of uniform-dimension video frame images to determine a set of internal spatial hierarchy features on each of the uniform-dimension video frame images;

inputting each set of internal spatial hierarchy features to a fully connected layer, the fully connected layer producing an intermediate physical estimate of the user's gaze location on the screen relative to the front-facing camera;

determining a series of screen locations based on the intermediate physical estimate and the dimensions of the screen; and labeling the gaze location on the screen.

15. A non-transitory computer readable medium storing instructions that, when executed by a processor, cause the processor to perform a method comprising:

receiving a video of a user taken by a front-facing camera of a device having a screen;

receiving dimensions of the screen;

parsing the video into a series of uniform-dimension video frame images;

inputting the series of uniform-dimension video frame images to an artificial neural network that is pretrained, thereby extracting a plurality of features from the series of uniform-dimension video frame images to determine a set of internal spatial hierarchy features on each of the uniform-dimension video frame images;

inputting each set of internal spatial hierarchy features to a fully connected layer, the fully connected layer producing an intermediate physical estimate of the user's gaze location on the screen relative to the front-facing camera;

determining a series of screen locations based on the intermediate physical estimate and the dimensions of the screen; and labeling the gaze location on the screen.

16. The non-transitory computer readable medium of claim 15, wherein the artificial neural network is pretrained by:

receiving a dataset of training videos, the training videos showing a variety of user environmental conditions, facial coverings, and user demographics;

receiving a ground truth gaze location for each training video in the dataset;

parsing each training video into a series of video frame images, where each video frame image includes the ground truth gaze location;

training the artificial neural network by processing the dataset to predict a gaze location for each video frame image; and iteratively reducing a difference between the predicted gaze location and the ground truth gaze location until a stable series of neural network weights is determined.

17. The non-transitory computer readable medium of claim 15, wherein the uniform-dimension video frame images have a same pixel dimension and are of a same file type.

18. The non-transitory computer readable medium of claim 15, wherein an approximate location of the user's gaze is determined by the user tracking one or more objects across the screen.

19. The non-transitory computer readable medium of claim 15, further comprising:

determining at least one pattern between extracted features; and associating each extracted feature with a labeled predicted gaze location on each uniform-dimension video frame image.

20. The non-transitory computer readable medium of claim 19, wherein patterns are determined across the series of uniform-dimension video frame images.

\* \* \* \* \*